United States Patent [19]

Arnold et al.

[11] Patent Number: 4,809,785
[45] Date of Patent: Mar. 7, 1989

[54] AGRICULTURAL WORKING VEHICLE WITH ELECTRO-HYDRAULIC FOR REGULATING LIFTING MECHANISM ARRANGEMENTS

[75] Inventors: Winfried Arnold, Vaihingen/ENZ; Horst Hesse, Stuttgart; Friedrich-Wilhelm Höfer, Ditzingen; Heinrich Lödige, Vaihingen/ENZ; Hubert Mohaupt, Bietigheim-Bissingen; Werner Schumacher, Asperg, all of Fed. Rep. of Germany

[73] Assignee: Robert Bosch GmbH, Stuttgart, Fed. Rep. of Germany

[21] Appl. No.: 894,774

[22] Filed: Aug. 8, 1986

[30] Foreign Application Priority Data

Aug. 16, 1985 [DE] Fed. Rep. of Germany ....... 3529243
Feb. 11, 1986 [DE] Fed. Rep. of Germany ....... 3604218

[51] Int. Cl.⁴ .......................................... A01B 63/112
[52] U.S. Cl. .......................................... 172/9; 307/529
[58] Field of Search .................. 172/2, 3, 7, 9, 10; 280/446 R, 446 A; 307/154, 529

[56] References Cited

U.S. PATENT DOCUMENTS 4,454,919 6/1984 Arnold et al. ....................... 172/7 X
4,503,916 3/1985 Weigardt ............................ 172/9 X
4,518,044 5/1985 Weigardt et al. ...................... 172/7

FOREIGN PATENT DOCUMENTS 2508620 8/1975 Fed. Rep. of Germany .......... 172/7
2093676 9/1982 United Kingdom ................. 172/10

Primary Examiner—Richard T. Stouffer
Attorney, Agent, or Firm—Michael J. Striker

[57] ABSTRACT

An electro-hydraulic arrangement regulating the lifting mechanism actuatable by a hydraulic motor, on an agricultural working vehicle having a driven wheel, comprises a plurality of sensors including a position sensor forming an actual value position signal, a force sensor forming an actual value force sensor, and an additional sensor forming an actual value slippage signal dependent on slippage of the driven wheel, a nominal value transmitter, a first summation point connected with the additional sensor and with the force sensor so as to obtain the slippage-dependent signal and the actual value force signal therefrom and to produce an output signal, a mixing device having a first input connected with the first summation point and for receiving the output signal and a second input connected with the position sensor for receiving the actual value position signal and producing an output signal, and a second summation point connected with the mixing device for receiving the output signal of the mixing device and also connected with the nominal value transmitter for receiving a signal from the latter so as to form a regulating deviation for the lifting mechanism.

9 Claims, 2 Drawing Sheets

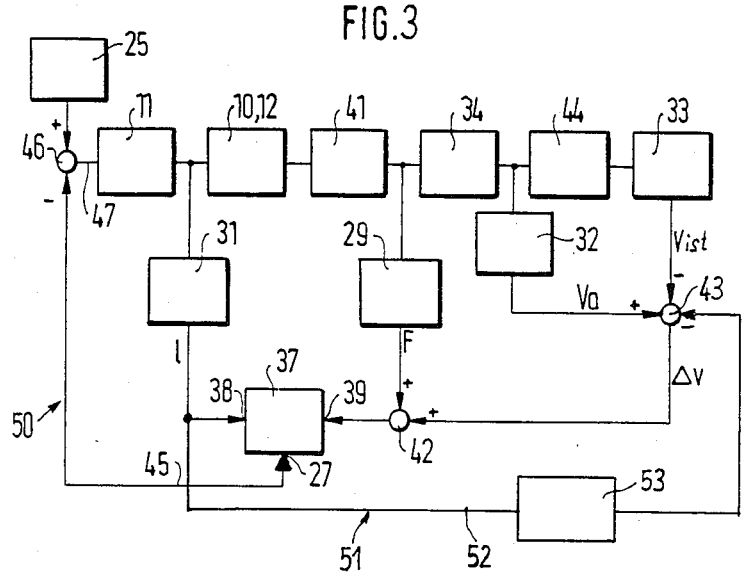
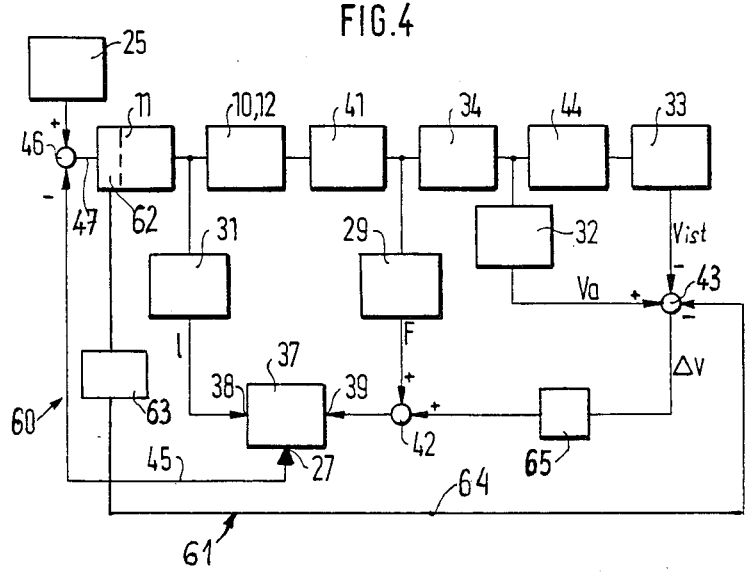

AGRICULTURAL WORKING VEHICLE WITH ELECTRO-HYDRAULIC FOR REGULATING LIFTING MECHANISM ARRANGEMENTS

BACKGROUND OF THE INVENTION

The present invention relates to an electro-hydraulic arrangement for regulating a lifting mechanism on an agricultural working vehicle.

Arrangements of the above mentioned general type are known in the art. One of such arrangements is disclosed, for example, in the West German document DE-OS No. 2,508,620. In the arrangement disclosed in this document, the regulated magnitudes of position, pulling force and slippage are processed in a combined manner so as to provide in many applications of the tractor an elastic and fast operation of the regulating arrangement. Despite the fact that the processing of a slippage dependent signal is advantageous in many applications, this arrangement has the disadvantage that the main regulating magnitudes of the position and pulling force are not processed with one another in a mixing regulation. For both main regulating magnitudes, the regulating deviation is determined separately with aid of two nominal value transmitters and supplied via a switch to a non-linear unit with dead zone, whose output signal is first combined with the slippage dependent signal. In this arrangement the regulated magnitudes of position and slippage can also be combined with one another, which is undesirable in many applications. Instead of the mixing regulation, the switch performs, however, a switching between both main regulating magnitudes of position and pulling force. Moreover, in many cases the direct processing of the regulating magnitude of slippage is not advantageous. In the known regulating arrangement the slippage effect is supplied by a non-linear member for the regulation, and there is a limitation that the slippage effect acts only within a certain region. Also, its effect upon the regulating circuit is constant when the associated switch is closed.

Furthermore, an electro-hydraulic regulating arrangement for a tractor with an attached plow is known in which the pulling force regulating system is completed by a slippage feedback. In this arrangement a differential signal is produced from a nominal value and an actual value of the slippage and forms a slippage regulating deviation. This slippage regulating deviation is supplied to the nominal value of the pulling force so that the resulting nominal value signal of the pulling force is greater when the slippage regulating deviation is positive and smaller when it is negative. First the resulting nominal value signal of the pulling force is compared with the actual value signal of the pulling force and the resulting regulating deviation is produced, which is used for controlling lifting or lowering of the plow. In this type of combining the signals for slippage regulating deviation and nominal value of the pulling force, a resulting nominal value of the pulling force is produced which can be smaller or greater than the nominal value of the force. The resulting regulating deviation produced after the comparison with the actual value of the pulling force exceeds the region predetermined for it or does not fill the same. This can lead to unfavorable operation of the regulating device. Further, in this combination of the regulating magnitudes of slippage and pulling force, a high component of the slippage regulation is not realized since the nominal value of the pulling force is always in full strength to be added with the slippage regulating deviation. In many cases, however, a higher portion of slippage regulation is advantageous. A further disadvantage can also be in that with the position admixture, the slippage effect acts always in full magnitude over the nominal value. In this arrangement therefore a real mixing regulation is impossible. The use of two nominal value transmitters not only increases the expenses but also reduces the operator's comfort.

SUMMARY OF THE INVENTION

Accordingly, it is an object of the present invention to provide an electro-hydraulic arrangement for regulating a lifting mechanism on an agricultural working vehicle, which avoids the disadvantages of the prior art.

More particularly, it is an object of the present invention to provide an electro-hydraulic arrangement for regulating a lifting mechanism on an agricultural working vehicle, in which with relatively low expenses and high operator's comfort, an optimal position control of the lifting mechanism is obtained.

In keeping with these objects and with others which will become apparent hereinafter, a first summation point receives a slippage-dependent signal from a slippage sensor and then actual value force signal from a force sensor and produces an output signal, a mixing device receives at its first output the output signal and at its second output an actual value position signal from a position sensor and produces its output signal, and a second summation point receives the output signal of the mixing device and also a signal from a nominal value transmitter to form a regulating deviation for a regulating circuit so as to actuate a hydraulic motor which operates the lifting mechanism.

This processing of the slippage-dependent signal provides the advantage that, despite minimal number of controlling members or nominal value transmitters, in position regulation the slippage effect is automatically blended and therefore becomes ineffective. When further in unfavorable operational conditions oscillations in the regulating circuit take place by the slippage evaluation, these oscillations can be reduced by position admixing, since the position admixing simultaneously weakens the slippage effect.

In accordance with another advantageous features of the present invention, the slippage-dependent signal is formed by a differential speed between a driven speed of a driven wheel and a speed of the working vehicle relative to the ground. In condition of small speeds of the tractor this has the result that the regulating magnitude of the differential speed overweighs in the ratio to the regulating magnitude of slippage. This leads first of all in unfavorable operational conditions to an advantageous operation in that, for example, during operation of a tractor in the beginning of the field, drawing-in of the plow by pulling is obtained, while during travelling of the tractor out of the field end the plow remains longer at a constant depth when the tractor travels out of the furrow In accordance with another feature of the present invention, the sensors and the mixing device of the arrangement for determining and processing of the regulating magnitude of position, force and slippage are formed as electronic systems. In this case the regulating arrangement can be executed in an especially simple and easily assembled manner.

The mixing device can be adjustable as to the ratio of input signals to be processed, especially with the aid of a control element. This is favorable for the construction of the mixing device.

For forming the regulating deviation from the signals of the regulating magnitudes of position, force and slippage, the regulating arrangement is provided with only one nominal value transmitter. As a result of this the operator's comfort is increased and simultaneously the required expenses are reduced.

In accordance with a further especially advantageous feature of the present invention, a lifting speed-dependent signal is fed back into the slippage regulating circuit. Thereby it is possible to provide a slippage regulating circuit which is inclined very little to oscillations, for which stability the amplification of the slippage regulating circuit is decisive. In determination of the amplification, a compromise must be achieved between instability with very high amplification on the one hand, and proportional deviation or inaccuracy of the slippage regulating circuit with too small amplification on the other hand. By the stabilizing feedback the amplification can be provided in correspondence with the requirements to the accuracy of the slippage regulating circuit. The arrangement for regulating of the lifting mechanism operates extremely oscillation-free in critical ground conditions. Also the disadvantages of stabilization by only position admixing are avoided, which is achieved only by mixing a relatively high position portion and therefore increase the danger of excessive gaps changes on hilly terrain and the danger of sticking the tractor in the ground.

In accordance with further especially advantageous features of the invention, the signal of the position sensor can be used as lifting speed-dependent signal, and the differentiating member can be provided in feedback conduit branch for supplying its output signal to the second summation point. A signal generator can be arranged in the feedback conduit branch and produce the lifting speed-dependent signal from the magnitudes of the switching condition and switching duration of the valve stage in the regulator of the lifting mechanism and especially the regulating deviation, to switch the slippage-dependent regulating circuit. In this case the feedback conduit can be provided in a simple and advantageous manner with lifting-dependent signals, and the available signal can be further processed is not changed form.

A further advantageous stabilization is performed for regulating the lifting mechanism in that the feedback produces a signal dependent upon the lifting speed of the mounting device and switches the superposed regulating circuit for the slippage-dependent signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 3 and 4 show block diagrams of regulating arrangements of a second and third embodiment, with stabilizing feedback in the slippage regulating circuit.

DESCRIPTION OF THE PREFERRED EMBODIMENTS

Figure 1:
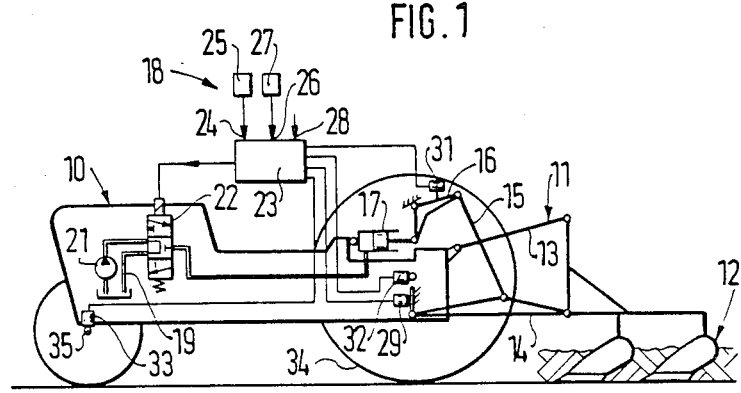
FIG. 1 is a side view of a tractor with a plow attached therewith and with an inventive electro-hydraulic arrangement for regulating the lifting mechanism.

FIG. 1 shows an agricultural working vehicle formed as a tractor 10 and a working implement formed as a plow 12 which is articulately connected to the tractor 10 at its rear end via a mounting device 11.

The mounting device 11 is formed in a known manner as a three-point linkage with upper links 13 and lower links 14. The lower links 14 are actuatable via a lift rod 15 and an angled lift arm 16 from a hydraulic power lift 17 and thereby form parts of an electro-hydraulic mechanism-regulating device 18. The power lift 17 is arranged in a hydraulic circuit 19 with a pump 21 and an electro-hydraulic regulating valve 22.

The regulating valve 22 is controlled by an electronic control device 23 which operates as a regulator and can also be formed in accordance with a micro-processing technique. Via a first input 24 which is shown in simplified manner, the control device 23 is supplied with signals of a nominal value transmitter 25. Through a second input 26, the control device 23 is in communication with a mixing control element 27. Any portion of position regulations on the one hand, and a combined power-slippage regulation, on the other hand, can be selected by means of the mixing control element 27. Through a third control input 28, the amplification of the slippage-dependent signals can be varied and simultaneously also completely cut off.

The control device 23 also is in operative communication with several sensors to obtain actual values. A pulling force sensor 29 supplies the control device 23 with signals which are proportional to the magnitude of the pulling force and formed in the lower links 14. A position sensor 31 supplies the control device 23 with signals which are dependent upon the position of the mounting device 11 relative to the housing of the tractor 10. Finally, the control device 23 is in operative communication with a first rotary speed sensor 32 and a second rotary speed sensor 33. The first rotary speed sensor is associated with a rear wheel 34 and determines thereby the drive speed of the driven wheel axle. The second rotary speed sensor 33 is associated with a driven front axle 35 and therefore determines the actual value of the speed of the tractor 10 relative to the ground. The control device 23 subtracts from generally greater signals of the first rotary speed sensor 32, the signals of the second rotary speed sensor 33 and form therefore the differential speed $\Delta V$ as a slippage-dependent signal, which is further processed in the control device 23.

Figure 2:
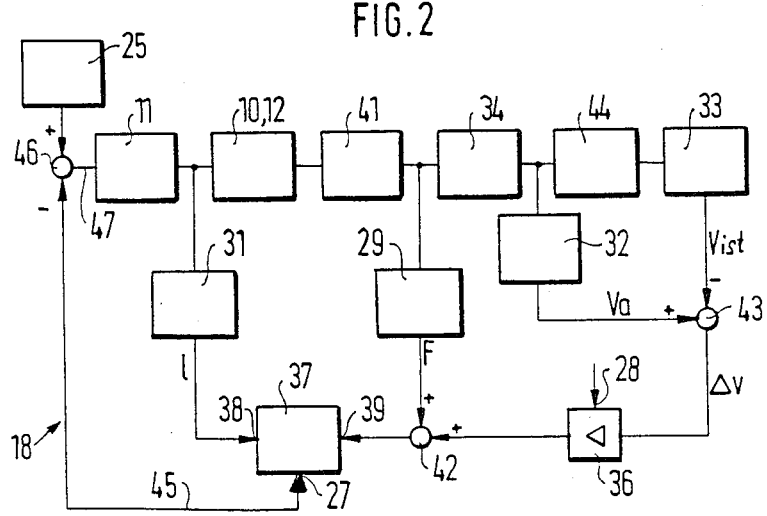
FIG. 2 is a block diagram for the tractor with the regulating arrangement of FIG. 1.

The operation of the regulating device 18 in the tractor 10 is illustrated by a block diagram shown in FIG. 2. The basic operational steps of an electro-hydraulic lifting mechanism-regulating device in a plow with a tractor 10 is considered as being known per se. As can be seen from FIG. 2, three magnitudes, namely the position L, the pulling force F and the slippage-dependent signal in form of differential speed $\Delta V$ are processed with each other.

For the plow with the tractor 10 an operator selects at the third control input 28 a predetermined amplification for differential speed signal $\Delta V$. As shown from experiments, an especially favorable operation of the regulating device is achieved when the amplification is selected within an order of between 5 and 10%. This does not preclude that in special cases the amplification factor can be selected as 1, and when required also the return of the slippage signal is thereby completely cut off so that the amplification factor is selected as zero.

Further, the operator selects with the aid of the mixing control element 27 of a mixing device 37, the type of regulation. If the mixing control element 27 is located in its one end position, then only the position signal L produced at the first input 38 of the mixing device 37 is processed in the lifting mechanism-regulating device 18 and thereby a pure position regulation takes place. If the mixing control element 27 is located in its opposite other end position, the actual value produced at the second input 39 is processed in the regulating device 18, and in correspondence with the respective conditions, a combined pulling force-slippage regulation is performed. In positions of the mixing control element 37 between the above both end positions, the signals at both inputs 38 and 39 are mixed with one another in respectively preselected ratio. It should be mentioned that the mixing control element 27 is located in a central position and thereby the signals at both inputs 38 and 39 are operative in their halves and the mixing ratio is selected as 1:1.

As can be seen from the block diagram of FIG. 2, the position of the lifting mechanism 11 relative to the tractor 20 is determined by the position sensor 31 which supplies a respective position nominal value signal L to the mixing device 37. In the system composed of the tractor 10 and the plow 12, a ground resistance 41 is applied to the plow. The pulling force sensors 29 determine from the ground resistance a nominal value of the pulling force F and supplies the same to a first summation point 42. With the aid of the first rotary speed sensor 32, the driving speed $v_a$ is determined from the drive 34 on the rear wheels and supplied to a second summation point 43. Because of the ground friction 44, the tractor 10 moves with plows with a speed which is smaller than the driving speed. This smaller speed is determined with the aid of the second rotary speed sensor 33 on the non-driven front wheel and subtracted as an actual value of the speed $v_{ist}$ in the second summation point 43, from the driving speed $v_a$. The differential speed $\Delta V$ formed in the second summation point 43 is supplied via the amplifier-device 36 to the first summation point 42. In the first summation point 42, the differential speed $\Delta V$ is superimposed upon the actual value of the pulling force F, or in other words added, and the sum signal produced thereby is supplied to the second input 39 of the mixing device 37. In correspondence with the mixing ratio of 1:1 preselected by the control element 27, the mixing device 37 forms from the received signals a regulating magnitude 45 which, in a third summation point 46, is compared with the signal supplied from the nominal value transmitter 25 and forms from the comparison a deviation 47. The deviation 47 acts upon the regulating device 18 in a direction to reduce the deviation.

The regulating device 18 provides therefore a high operational comfort by this processing of the slippage-dependent signal to the actual value of the pulling force with a relatively simple structure. Despite the utilization of a single nominal value transmitter 25, the slippage action in the position regulation is automatically cut off and thereby made ineffective. When on the other hand in unfavorable operational conditions, oscillations in the regulation circuit because of the slippage-dependent signal take place, these oscillations can be reduced by position admixing, since the position admixing simultaneously weakens the slippage effect. The processing of the differential speed has in addition the advantage that in condition of smaller speeds of the tractor 10, it becomes more effective. This provides first of all the advantages in that when at the beginning of the field the plow is drawn faster into it and when at the end of the field and removal of the tractor the plow is longer removed from the furrow, its depth remains constant.

FIG. 3 shows a block diagram of a second regulating device 50 which differs from the first regulating device 18 of FIG. 2, and in which the same structural elements are identified with the same reference numerals.

The second regulating device 50 has a feed back 51 for stabilization. A feed back branch 52 leads from the position sensor 31 to the second summation point 43 in the slippage regulation circuit. The position signal L received at the position sensor 31 is differentiated in a differentiating member 53 upon time and subtracted at the summation point 43 from the differential speed $\Delta V$. Therefore the lifting or lowering speed of the mounting device 11 is superimposed in a coupled manner upon the differential speed $\Delta V$.

The second regulating device 50 operates in accordance with the principle which is similar to the principle of the first regulating device 18. However, it is less inclined to oscillations because of the stabilizing feed back 51 in the slippage regulating circuit. This is especially important in critical ground conditions. A stabilization by only admixture of a relatively high position portion with all its disadvantages does not take place. It is possible to consider better the requirements of the accuracy in the slippage regulating circuit with adjustment of the amplification.

FIG. 4 shows a block diagram of a third regulating device 60 which differs from the regulating devices of FIGS. 2 and 3 and in which the same structural elements are identified with the same reference numerals.

The third regulating device 60 has a feed back 64 similarly to the second regulating device 50. A feed back branch 61 with a counter coupling extends however from the mounting device 11 and determines there a lifting speed-dependent signal from the signals of the associated regulators 60 of the lifting mechanism. For this purpose a signal generator 63 is arranged in the feed back branch 61. The signal generator 63 determines the lifting speed-dependent signal from the switching condition, the switching time and/or the deviation of the valve stage in the regulator 62. The signal generator 63 processes, in the case of proportionally operating valves directly their control signal which is a measure for the lifting or lowering speed. In the event of switching valves with time transition function, the time progress of the lifting speed is always constant, so that the signal generator 63 can subsequently form the lifting speed starting from switching-in point. The initial signal of the signal generator 63 is superimposed in the second summation point 43 with the differential speed $\Delta V$. In the third regulating device 60 a stabilization is attained in a manner similar to the second regulating device.

A differentiating device 65 is further provided between both summation points 42 and 43 in FIG. 4. The differentiating device 65 differentiating the slippage-dependent signal $\Delta V$ and therefore provides a stabilization in the slippage regulating circuit. The action of the differentiating device 65 can be used in connection with the first regulating device 18, or in combination with a feed back 51 as shown in FIG. 4. In both cases the use of a D-portion in the slippage regulating circuit can be used for the stabilization.

It is to be understood that modifications are possible in the above presented embodiments without departing from the present invention. Despite the special combination of the shown regulating device with the processing of the differential speed, it is also possible to admit as a regulating magnitude the slippage instead of the differential speed. In vehicles with all driven wheels, a reverse sensor or an optical speed sensor can be used on the front axle for determination of the actual speed instead of the rotary speed sensor 33. It is also possible in addition to the above shown three regulating magnitudes, also to process an additional parameter in the regulating device 18. Furthermore, it is recommended that instead of the embodiment shown in FIG. 1, a regulating device is used in which the position regulating circuit and the pulling force regulating circuit are formed as fully hydraulically operating devices, and the slippage-dependent signal is determined via a suitable electro-hydraulic converter in the regulating device.

It will be understood that each of the elements described above, or two or more together, may also find a useful application in other types of constructions differing from the types described above.

While the invention has been illustrated and described as embodied in an electro-hydraulic arrangement for regulating a lifting mechanism on an agricultural working vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural working vehicle having a driven wheel, a lifting mechanism on said vehicle, said mechanism actuatable by a hydraulic motor, an electro-hydraulic arrangement on said vehicle, said arrangement regulating said lifting mechanism, said arrangement comprising a plurality of sensors including a position sensor forming an actual value position signal, a force sensor forming an actual value force signal and an additional sensor forming an actual value slippage signal dependent on slippage of the driven wheel, said additional sensor being formed so as to determine a differential speed between a driven speed of the driven wheel and a speed of the working vehicle relative to the ground, thus forming said slippage-dependent signal; a nominal value transmitter; a first summation point connected with said additional sensor and with said force sensor so as to obtain the slippage-dependent signal and the actual value force signal therefrom and to produce an output signal; mixing means having a first input connected with said first summation point and for receiving said output signal and a second input connected with said position sensor for receiving said actual value position signal and producing said output signal; and a second summation point connected with said mixing means for receiving said output signal of said mixing means and also connected with said nominal value transmitter for receiving a signal from the latter so as to form a regulating deviation for said lifting mechanism, said nominal value transmitter being one and only one single nominal value transmitter for producing said regulating deviation from the actual value position, force and slippage signals, said sensors and said mixing means being formed as electronic systems.

2. An arrangement as defined in claim 1, wherein said mixing means is adjustable so as to adjust the ratio of signals supplied thereto; and further comprising means for adjusting said mixing means.

3. An arrangement as defined in claim 2, wherein said adjusting means includes a control element.

4. An arrangement as defined in claim 1; and further comprising an amplifier arranged between said additional sensor and said first summation point for amplifying the slippage-dependent signal, and having an adjustable amplification factor; and means for adjusting the amplification factor of said amplifier.

5. An arrangement as defined in claim 4, wherein said amplifier is formed as a switch which simultaneously interrupts feedback of the slippage-dependent signal.

6. An arrangement as defined in claim 1, wherein said additional sensor forms a regulating circuit; and further comprising a feed back which supplies to said regulating circuit of said additional sensor a signal depending upon a lifting speed of said lifting mechanism of said vehicle.

7. An arrangement as defined in claim 6, wherein said feed back is connected with said position sensor so as to use the position signal as said lifting speed-dependent signal, said feed back having a branch which is provided with a differentiating member forming an output signal which is supplied to said second summation point.

8. An arrangement as defined in claim 7; further comprising a regulator for the lifting mechanism and having a valve stage, said feed back having a feed back branch provided with a signal generator which produces from the magnitudes of switching condition, switching duration of said valve stage of said regulator and the deviation of the valve stage of the regulator, said lifting speed-dependent signal.

9. An arrangement as defined in claim 1, wherein said additional sensor forms a regulating circuit differentiating means arranged before said first summation point for switching the actual value force signal.

* * * * *